(12) United States Patent
Gabathuler

(10) Patent No.: US 7,043,039 B2
(45) Date of Patent: May 9, 2006

(54) HOUSING FOR A HEARING AID OR HEARING DEVICE RESPECTIVELY

(75) Inventor: Bruno Gabathuler, Stäfa (CH)

(73) Assignee: Phonak AG, Stafa (CH)

( * ) Notice: Subject to any disclaimer, the term of this patent is extended or adjusted under 35 U.S.C. 154(b) by 127 days.

(21) Appl. No.: 10/768,321

(22) Filed: Jan. 30, 2004

(65) Prior Publication Data

US 2005/0111684 A1 May 26, 2005

(30) Foreign Application Priority Data

Nov. 21, 2003 (EP) ................... 03026777

(51) Int. Cl.
*H04R 25/00* (2006.01)
(52) U.S. Cl. .................. 381/322; 381/323; 381/324
(58) Field of Classification Search ................ 381/312, 381/314, 322, 323, 324, 328, 380, 330, 381; 181/129, 130, 135; 429/96–100
See application file for complete search history.

(56) References Cited

U.S. PATENT DOCUMENTS

| 4,272,591 | A | * | 6/1981 | Brander | ................... 429/98 |
| 4,831,655 | A | * | 5/1989 | Buettner | .................. 381/322 |
| 6,678,385 | B1 | * | 1/2004 | Olsen | .................. 381/322 |
| 2003/0185413 | A1 | * | 10/2003 | Schmitt | .................. 381/322 |

* cited by examiner

*Primary Examiner*—Huyen Le
(74) *Attorney, Agent, or Firm*—Pearne & Gordon LLP

(57) ABSTRACT

The present invention relates to a housing of a hearing aid or hearing device respectively with a base plate, a shell connected with the base plate and an electronic module, whereby the electronic module consists at least of a clamping device to hold the battery consisting of a cap pivotable over an axis. The axis thereby consists of two bushes axially relocatable beyond each end and insertable into accordingly provided openings or bores respectively of the base plate. The axis will thereby be connected with the base plate, and the forces acting onto the axis will be transferred to the base plate and not into the electronic module. Furthermore, the electronic module will be locked within the base plate by the bushes.

10 Claims, 2 Drawing Sheets

HOUSING FOR A HEARING AID OR HEARING DEVICE RESPECTIVELY

BACKGROUND OF THE INVENTION

This invention relates to a housing of a hearing aid or hearing device respectively with a base plate, a shell connected with the base plate and an electronic module, whereby the electronic module consists at least of a clamping device to hold the battery consisting of a cap pivotable over an axis A base plate or face plate respectively will commonly be used for the construction of housings of hearing aids or hearing devices respectively, to which on one hand the shell, i.e. the external housing wall, and on the other hand the electronic elements are arranged.

A base plate will be used for instance for in-the-ear hearing devices, to which the shell adapted individually for the respective wearer will be attached. The attachment between the base plate and the shell adapted to the wearer of the hearing device is regularly made by adhesion or welding respectively or by manufacturing of the entire housing for in-the-ear hearing devices by laser sintering or stereo lithography. The base plate therefore provides an opening into which the complete electronic of the device, preferably in form of a module, will be inserted or latched. The battery compartment is regularly integrated within this module as well, which features a battery cap pivotable arranged over an axis. The battery providing energy to the module may therefore easily be replaced. This replacement may be performed either by specialists or the wearer of the hearing device itself. The advantage of this construction lies in the fact that one unique module may be used for different, usually individually manufactured hearing devices. Due to the integration of the axis of the battery cap in or at the module, all the forces caused by the manipulation of the cap, for instance by opening or closing of the cap, will indeed be transferred to the module. Those forces may on one side directly damage components of the module and on the other hand damage the current linkage between those components. Especially the contacts, conducting paths and wires of the module are very sensitive with respect to such mechanical force influences.

SUMMARY OF THE INVENTION

It is an object of the present invention to provide a housing construction for hearing aids or hearing devices respectively preventing the transmission of forces over the battery cap in its open state to the main plate or electronic module respectively of the hearing aid or hearing device respectively.

The present invention provides a housing of a hearing aid or hearing device respectively with a base plate, a shell connected with the base plate and an electronic module, whereby the electronic module consists at least of a clamping device to hold the battery consisting of a cap pivotable over an axis, whereby the axis consists of two bushes axially relocatable beyond each end and insertable into accordingly provided openings or bores respectively of the base plate, thereby connecting the axis with the base plate.

As the axis for the cap is not attached permanent or directly to the electronic module, but is attached over the bushes reloctable arranged over the axis, the forces transmitted over the cap to the axis will advantageously not be transmitted to the electronic module but to the base plate. The electronic module therefore will remain substantially free of forces and therefore the attached electronic components may not be influenced or damaged. The electronic module may nevertheless be inserted into the base plate and eventually removed out of the base plate if it has to be replaced or repared.

In one embodiment of the invention, the electronic module consists of bores for the lead-through of the ends of the axis on both sides of the opening for the cap, which bores have larger diameters than the diameter of the axis. The diameter thereby is equal or larger as the diameter of the end areas of the bushes. The bushes thus may easy be relocated through those bores to the outside of the base plate. If there is preferably provided tolerance between the bores and the axis, the frictional connection between the bushes and the electronic module will be disconnected and thus reliably no axial or radial forces from the axis over the bushes will be transferred to the electronic module.

In another embodiment of the invention, the bushes consist each of a stop element, preferably in form of a rib, which element may be brought in axial direction with respect to the axis into contact against a correspondingly accomplished catch, preferably the surface of an opening.

In a further embodiment of the invention, the bushes consist of plastic, ceramic or metal. They therefore provide high strength durability as well as good slip characteristics with respect to the axis.

In a further embodiment of the invention, the openings or bores respectively of the base plate are arranged within the base plate or in a beaded rim distant to the outside of the base plate. The base plate may have reinforcements as well in this area to take up the forces optimally.

In a further embodiment of the invention, the bushes in its fully inserted positions are covered at least partially by areas of the cap in its closed position, preventing any axial movement in direction of the cap. The bushes will thereby be fixed in its final positions and thus the cap may not loosen.

A further embodiment of the invention relates to a hearing device or hearing aid respectively with a housing with a base plate, a shell connected with the base plate and an electronic module, whereby the electronic module consists at least of a clamping device to hold the battery consisting of a cap pivotable over an axis, whereby the axis consists of two bushes axially relocatable beyond each end and insertable into accordingly provided openings or bores respectively of the base plate, thereby connecting the axis with the base plate.

The present invention further provides the use of a housing with a base plate, a shell connected with the base plate and an electronic module, whereby the electronic module consists at least of a clamping device to hold the battery consisting of a cap pivotable over an axis, whereby the axis consists of two bushes axially relocatable beyond each end and insertable into accordingly provided openings or bores respectively of the base plate, thereby connecting the axis with the base plate for hearing aids or hearing devices, preferably for in-the-ear hearing devices. The claimed housing arrangement is especially for in-the-ear hearing devices of a great advantage, as it may be layed out in very small dimensions, as occurs with this type of hearing devices.

DESCRIPTION OF THE DRAWINGS

For purpose of facilitating and understanding of the invention, there is illustrated in the accompanying drawings a preferred embodiment thereof to be considered in connection with the following description. Thus the invention may be readily understood and appreciated. It will be shown in FIG. 1 the view of an inventively accomplished housing in the area of the inserted electronic module.

DESCRIPTION OF A PREFERRED EMBODIMENT

Figure 1:
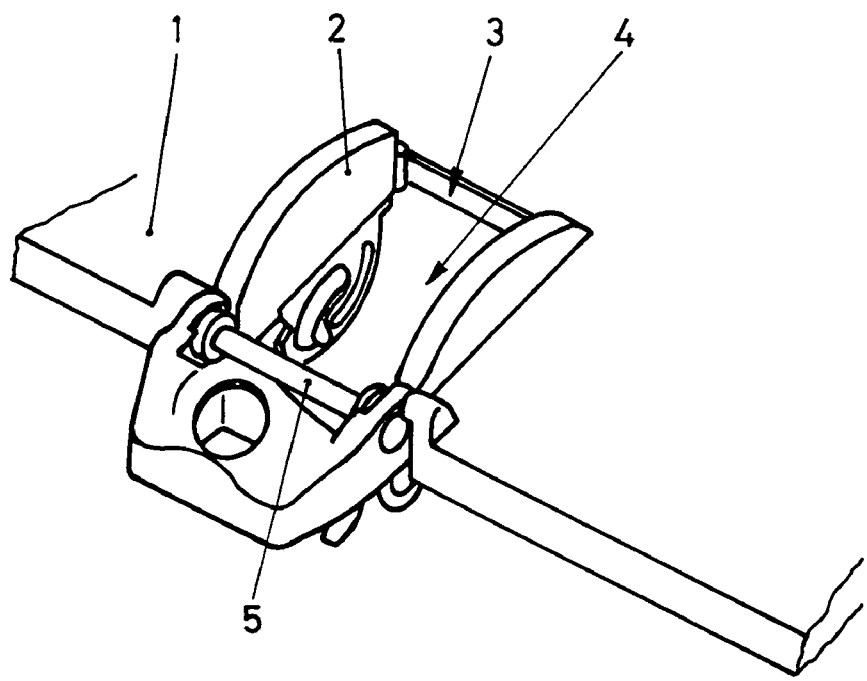

FIG. 1 shows the view onto the area of a housing for hearing aids or hearing devices respectively with an electronic module 2 inserted within the base plate 1. The base plate 1 is pictured pure schematically as a straight section, however may consist of any other suitable form. The outer shell of the housing of the hearing aid may especially have the shape of the inner ear and the base plate provides the part of the housing visible from the outside or protruding from the ear canal to the outside respectively.

The electronic module 2 will be inserted by an opening 3 of the base plate 1, thus providing the electronic elements of the electronic module 2 lying within the inside of the housing of the hearing aid. The electronic module 2 consists as well of an opening 4 directed to the outside, which may be closed by a pivotable arranged cap (not shown for clarity purposes). A battery, normally a button cell, will be inserted into this opening 4 to supply the electronic components of the electronic module 2 with power. The pivotable arranged cap is provided for an easy replacement of the battery on demand.

The cap will be attached onto the axis 5 arranged transverse to the opening 4 at the electronic module 2. For conventional electronic modules 2, this axis 5 is integrated directly within the electronic module 2, thereby unfavorably transmitting the forces acting onto the axis by opening and closing of the cap directly onto the electronic module 2.

Figure 2:
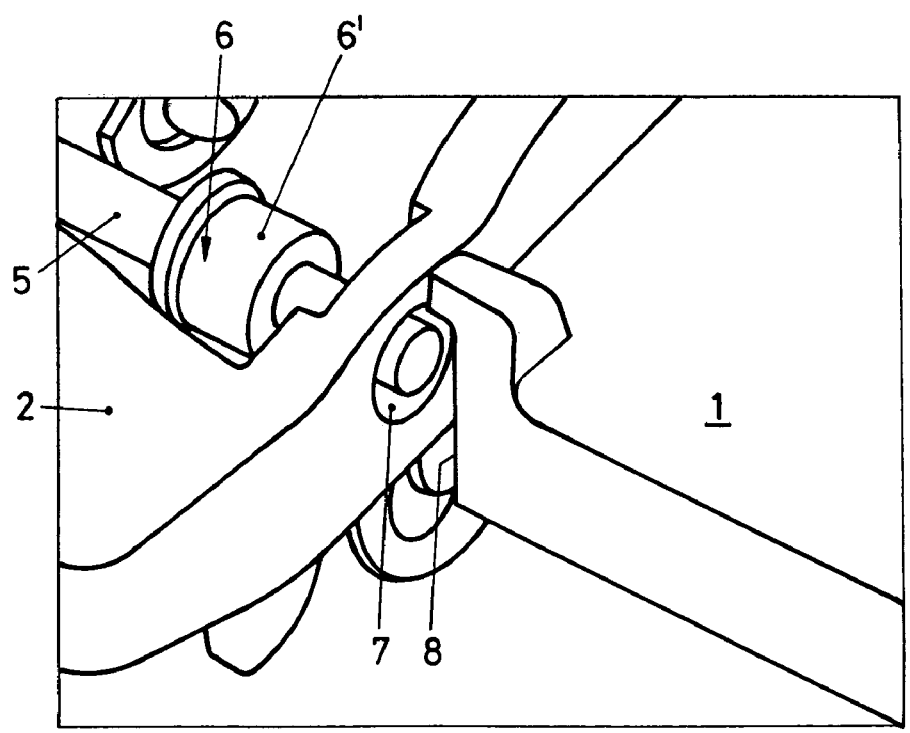
FIG. 2 the view of the housing according FIG. 1 with the bushes in its insertion position.

The inventive housing consist of bushes 6 positioned at both ends of the axis 5, according FIG. 2. The axis 5 thereby has preferably a maximum length corresponding to the width of the electronic module 2 in the area of the axis 5. The electronic module 2 may thus easily be inserted or plugged in respectively through the opening 3 of the base plate 1. A projection or stop is preferably provided on the electronic module 2 or the base plate 1 to define the definitive plug-in depth of the electronic module 2.

The electronic module 2 consists further of a persistent bore 7 in the transit area of the axis 5 which complies at least with the outer diameter of the outer area 6' of the bush 6 and which has a greater diameter as the diameter of the axis 5. Further openings or bores 8 are provided within the base plate 1 opposite to the front wall of the axis 5, complying with the diameter of the outer area 6' of the bush 6.

Figure 3:
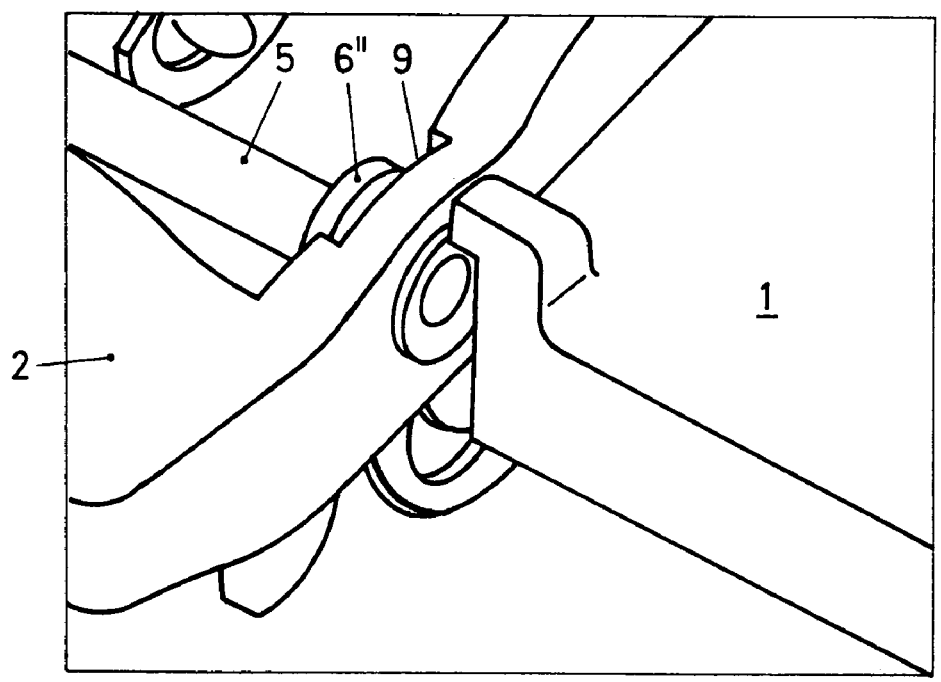
FIG. 3 the view according FIG. 2 with the bushes in its first inserted position.

Therefore, the bushes 6 are axially relocatable along the axis 5 to the outside within the area of the electronic module 2, as shown in FIG. 3.

Figure 4:
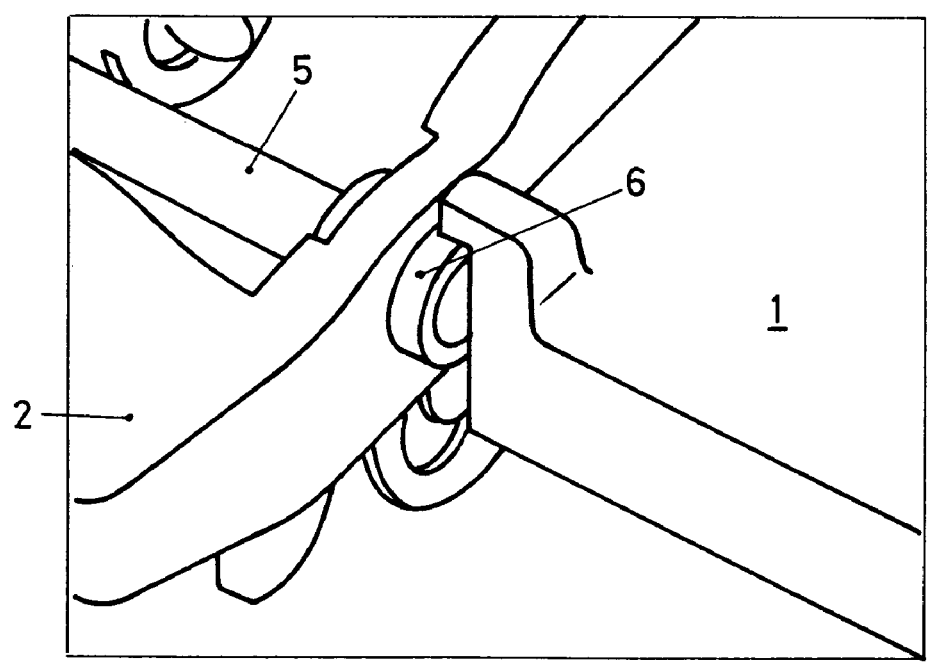
FIG. 4 the view according FIG. 2 with the bushes in its final inserted position.

The bushes 6 are further axially relocatable to the outside until reaching its stops, as shown in FIG. 4. The outer area of the bush 6 thereby penetrates the opening 8 of the base plate 1. The radial and axial components of the forces acting onto the axis 5 will thus be transferred to the base plate 1 and the electronic module 2 thereby advantageously remains practically free of the influence of those forces.

The inner area of the bush 6 consists of a rim 6" acting as a stop. This area will be brought into stop in axial direction against the inner surface of a corresponding opening 9 of the base plate 1 and will therefore fix the electronic module 2 within the base plate 1.

By the inventive arrangement on one side the forces acting onto the axis 5 will be directed into the base plate 1 thus holding the electronic module 2 free of forces and on the other side fixing or locking respectively the electronic module 2 within the base plate 1.

I claim:

1. Housing of a hearing aid or hearing device respectively with a base plate and an electronic module, whereby the electronic module includes at least of a clamping device of a battery compartment including a cap pivotable over an axis, whereby the axis includes two bushes axially relocatable beyond each end of the axis and insertable into accordingly provided openings or bores respectively of the base plate, thereby connecting the axis with the base plate.

2. Housing according to claim 1, whereby the electronic module includes bores configured to receive the ends of the axis on both sides of an opening for the cap, which bores have a larger diameter than the diameter of the axis, whereby the diameters of the bores are is equal to or larger than the outer diameter of the part of the bushes to be received within the bores.

3. Housing according to claim 1, whereby the bushes include each of a stop element, which element may be brought in axial direction with respect to the axis into contact against a correspondingly accomplished catch.

4. Housing according to claim 3, whereby the stop element is a rib.

5. Housing according to claim 3, whereby the catch is provided by the surface on an opening.

6. Housing according to claim 1, whereby the bushes include at least one of plastic, ceramic or metal.

7. Housing according to claim 1, whereby the openings or bores respectively of the base plate are arranged within the base plate or in a beaded rim distant to the outside of the base plate.

8. Housing according to claim 1, whereby the bushes in its fully inserted positions are covered at least partially by areas of the cap in its closed position, preventing any axial movement in direction of the cap.

9. A hearing device or hearing aid respectively with a housing with a base plate, and an electronic module, whereby the electronic module includes at least of a clamping device of a battery compartment including a cap pivotable over an axis, whereby the axis includes two bushes axially relocatable beyond each end and of the axis insertable into accordingly provided openings or bores respectively of the base plate, thereby connecting the axis with the base plate.

10. The user of a housing with a base plate, an electronic module, whereby the electronic module includes at least of a clamping device of a battery compartment including a cap pivotable over an axis, whereby the axis includes two bushes axially relocatable beyond each end of the axis and insertable into accordingly provided openings or bores respectively of the base plate, thereby connecting the axis with the base plate for hearing aids or hearing devices.

* * * * *

UNITED STATES PATENT AND TRADEMARK OFFICE
CERTIFICATE OF CORRECTION

| | | |
|---|---|---|
| PATENT NO. | : 7,043,039 B2 | Page 1 of 1 |
| APPLICATION NO. | : 10/768321 | |
| DATED | : May 9, 2006 | |
| INVENTOR(S) | : Bruno Gabathuler | |

It is certified that error appears in the above-identified patent and that said Letters Patent is hereby corrected as shown below:

In Column 4, line 26, please delete "is"; and

In Column 4, line 52, after "and" please delete "of the axis" and insert after "end" --of the axis--

Signed and Sealed this

Fifth Day of December, 2006

JON W. DUDAS
*Director of the United States Patent and Trademark Office*